(12) United States Patent
Abley et al.

(10) Patent No.: US 11,005,736 B2
(45) Date of Patent: May 11, 2021

(54) DETERMINING TRACEABILITY OF NETWORK TRAFFIC OVER A COMMUNICATIONS NETWORK

(71) Applicant: Afilias Limited, Dublin (IE)

(72) Inventors: Joseph Nicholas Abley, London (CA); Cedarampattu Mohan, Horsham, PA (US); Howard Eland, Horsham, PA (US); James Galvin, Horsham, PA (US)

(73) Assignee: AFILIAS LIMITED, Dublin (IE)

( * ) Notice: Subject to any disclaimer, the term of this patent is extended or adjusted under 35 U.S.C. 154(b) by 111 days.

(21) Appl. No.: 15/913,580

(22) Filed: Mar. 6, 2018

(65) Prior Publication Data

US 2019/0280948 A1 Sep. 12, 2019

(51) Int. Cl.
| | |
|---|---|
| *H04L 12/26* | (2006.01) |
| *H04L 12/46* | (2006.01) |
| *H04L 29/12* | (2006.01) |
| *H04L 12/851* | (2013.01) |

(52) U.S. Cl.
CPC .............. *H04L 43/04* (2013.01); *H04L 12/46* (2013.01); *H04L 43/062* (2013.01); *H04L 47/2483* (2013.01); *H04L 61/1511* (2013.01)

(58) Field of Classification Search
CPC ....... H04L 43/04; H04L 12/46; H04L 43/062; H04L 47/2483; H04L 61/1511
USPC ........................................................ 709/224
See application file for complete search history.

(56) References Cited

U.S. PATENT DOCUMENTS

| | | | | |
|---|---|---|---|---|
| 9,137,205 | B2* | 9/2015 | Rogers | H04L 63/0218 |
| 2009/0112814 | A1* | 4/2009 | Statia | H04L 29/12066 |
| 2019/0058697 | A1* | 2/2019 | Chang | H04L 63/0428 |
| 2019/0223009 | A1* | 7/2019 | Salmela | H04W 12/003 |
| 2019/0238504 | A1* | 8/2019 | Gupta | H04L 61/3025 |

* cited by examiner

*Primary Examiner* — Kevin T Bates
*Assistant Examiner* — Chen-Liang Huang
(74) *Attorney, Agent, or Firm* — Haynes and Boone, LLP

(57) ABSTRACT

A system and method for determining the traceability of network request traffic over a communications network for reducing strain in traffic processing resources, which includes: provisioning a direct interconnect on the communications network between the server and a predefined source, the direct interconnect providing a private service interface, a defined pairings data of the predefined source with the direct interconnect stored as a network traffic almanac; provisioning a public service interface on the communications network; receiving a request traffic having an address of the predefined source via the public service interface; consulting the defined pairing data with the address to determine the request traffic matches the predefined source; and de-prioritizing the processing of the request traffic based on the request traffic being received on the public service interface rather than on the direct interconnect by dynamically applying a prioritize criterion to the second request traffic before generating a response traffic.

20 Claims, 4 Drawing Sheets

DETERMINING TRACEABILITY OF NETWORK TRAFFIC OVER A COMMUNICATIONS NETWORK

FIELD

The present invention related to computer networks and more particularly to network traffic monitoring

BACKGROUND

Currently, difficulties exist in determining the traceability of traffic in real-time in high-capacity communications network environments. Individual packets have source addresses embedded as parameters within them; however, the authenticity of those parameters is difficult to determine. A packet with a non-authentic source address parameter is said to be "not traceable" by sole reference to that parameter. The stateless transport that in the early days of transactional network protocols (e.g. DNS protocols) reflected practical limitations in computation and network capacity remains as important today, as network request (e.g. query) load has increased and the demands for application performance have also increased. Further, the cost of computation and connectivity have decreased dramatically and so has the tolerance for transactional latency and incoherence. Stateless transport over the communications network can be efficient, but also cannot provide any effective traceability of a client for any network-based transaction. Since the DNS protocol, like many other transactional protocols, generally involves a small request and a large response, there exists the potential for payload amplification to be exploited by attackers. For example, large numbers of available servers globally, together with the stateless transport and lack of traceability of clients, makes payload amplification a common mechanism for network attacks. For example, a DNS amplification attack is a reflection-based distributed denial of service (DDos) attack, whereby the attacker spoofs look-up requests to domain name system (DNS) servers to hide the source of the exploit and direct the response to the target. Through various techniques, the attacker turns a small DNS query into a much larger payload directed at the target network. Whilst some success has been observed in eliminating DNS resolvers from the pool of available amplifiers by restricting their use to a constrained pool of clients, such constraints are not reasonable for authoritative servers which, more or less by definition, are intended to serve the whole communications network without exception.

As one example of network congestion, most serious attacks in the past several years have been characterised by a large number of well-connected and highly-distributed sources of attack traffic, possibly further exploiting amplifiers, delivering coordinated payloads over relatively short periods of time towards a set of victims. The traffic sources are generally pre-compromised consumer devices that are primed and ready to respond to direction from a command and control infrastructure. That these devices are commonly installed in consumer networks is highly relevant, since in practical terms it means (a) they are highly distributed, (b) they are increasingly well-connected, (c) they are very unlikely to be upgraded regularly, even if patches are available, and (d) there is no practical expectation of being able to contact a human operator. These devices represent botnets that continue to increase in size and capability, with no real expectation that this trend will reduce. Whilst significant efforts have been made to encourage access providers to coordinate in attack mitigation both in real-time and after-the-fact as part of forensic analysis, the observed impact of botnet-sourced attacks remains high. Efforts to reduce the opportunities for such devices to deliver source-spoofed traffic have been largely ineffective, partly because they are non-universal (and partly because residential networks tend to self-repair by the action of network address translation at their borders) but mainly because there is no great need to use amplifiers if your botnet is large enough. In recent years we have seen DNS servers promoted from accomplices in the denial of service business to victims.

Further, it is recognised that the existence of a thriving market in denial-of-service orchestration (and the use of DNS servers as amplifiers or targets as part of that market) is a somewhat tangential and ironic illustration of the importance of availability and performance for Internet-accessible services: ironic in the remaining observed cases where the very performance that attacks seek to degrade is framed by the performance and availability of the network (e.g. DNS) infrastructure that is used to amplify (or sink) the attack traffic. For example, an operator of authoritative DNS services hence has the unenviable job of simultaneously providing responsive and highly-available DNS service for legitimate request traffic whilst at the same time suppressing service for illegitimate traffic with no definitive way of distinguishing between either, and making that intractable decision in real time in an environment where competition dictates that the latency between request and response be as close to zero as possible.

SUMMARY

It is generally an advantage of the present invention to provide a traceability system or method to obviate or mitigate at least one of the above presented disadvantages.

Currently, difficulties exist in determining the traceability of traffic in real-time in high-capacity communications network environments. Individual packets have source addresses embedded as parameters within them; however, the authenticity of those parameters is difficult to determine. A packet with a non-authentic source address parameter is said to be "not traceable" by sole reference to that parameter. One solution to these difficulties is determining the traceability of network request traffic over a communications network for reducing strain in traffic processing resources by: provisioning a direct interconnect on the communications network between the server and a predefined source, the direct interconnect providing a private service interface between the predefined source and the server configured for receiving the network request traffic addressed from the predefined source, a defined pairings data of the predefined source with the direct interconnect stored in a storage as a network traffic almanac; provisioning a public service interface on the communications network configured for receiving the network request traffic addressed from the predefined source and from other sources, the public service interface separate from the direct interconnect; receiving a request traffic having an address of the predefined source via the public service interface; consulting the defined pairing data with the address to determine the request traffic matches the predefined source; and de-prioritizing the processing of the request traffic based on the request traffic being received on the public service interface rather than on the direct interconnect by dynamically applying a prioritize criterion to the request traffic before generating a response traffic.

One aspect provided by the present disclosure is a method for determining the traceability of network request traffic over a communications network for reducing strain in traffic processing resources, the method comprising: by a server: provisioning a direct interconnect on the communications network between the server and a predefined source, the direct interconnect providing a private service interface between the predefined source and the server configured for receiving the network request traffic addressed from the predefined source, a defined pairings data of the predefined source with the direct interconnect stored in a storage as a network traffic almanac; provisioning a public service interface on the communications network configured for receiving the network request traffic addressed from the predefined source and from other sources, the public service interface separate from the direct interconnect; receiving a first request traffic addressed from the predefined source via the direct interconnect; processing the first request traffic by generating a first query response and sending the first query response via at least one of the direct and the public service interface for communicating over the communications network to the predefined source; receiving a second request traffic having an address of the predefined source via the public service interface; consulting the defined pairing data with the address to determine the second request traffic matches the predefined source; and de-prioritizing the processing of the second request traffic based on the second request traffic being received on the public service interface rather than on the direct interconnect by dynamically applying a prioritize criterion to the second request traffic before generating a second response traffic.

A further aspect provided by the present disclosure is a server for determining the traceability of network request traffic over a communications network for reducing strain in traffic processing resources, the system comprising: a computer processor having a set of instructions stored on a storage for configuring the computer processor to: provision a direct interconnect on the communications network between the server and a predefined source, the direct interconnect providing a private service interface between the predefined source and the server configured for receiving the network request traffic addressed from the predefined source, a defined pairings data of the predefined source with the direct interconnect stored in a storage as a network traffic almanac; provision a public service interface on the communications network configured for receiving the network request traffic addressed from the predefined source and from other sources, the public service interface separate from the direct interconnect; receive a first request traffic addressed from the predefined source via the direct interconnect; process the first request traffic by generating a first query response and sending the first query response via at least one of the direct and the public service interface for communicating over the communications network to the predefined source; receive a second request traffic having an address of the predefined source via the public service interface; consult the defined pairing data with the address to determine the second request traffic matches the predefined source; and de-prioritize the processing of the second request traffic based on the second request traffic being received on the public service interface rather than on the direct interconnect by dynamically applying a prioritize criterion to the second request traffic before generating a second response traffic.

BRIEF DESCRIPTION OF THE DRAWINGS

Exemplary embodiments of the invention will now be described in conjunction with the following drawings, by way of example only, in which.

DESCRIPTION

Figure 1:
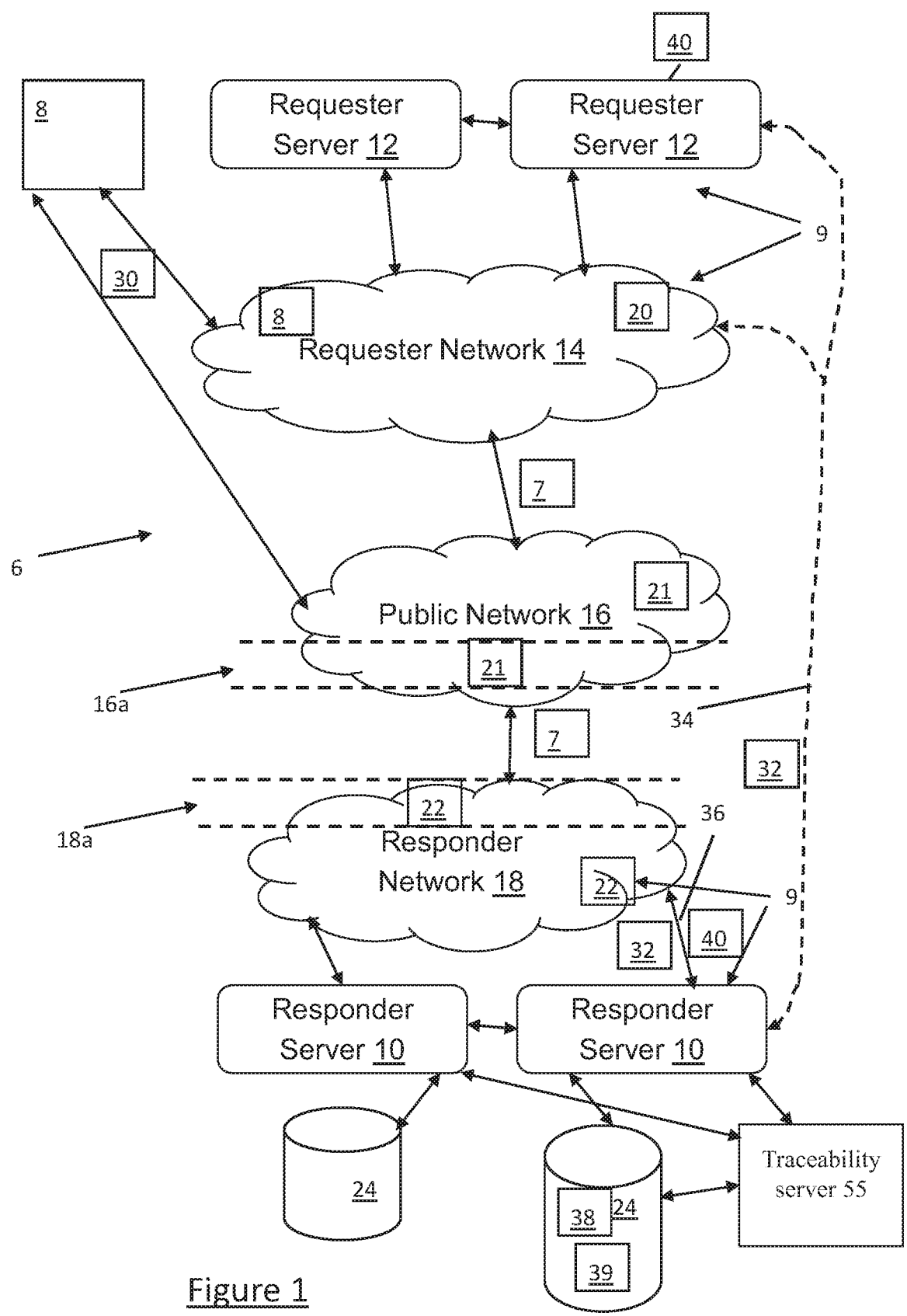
FIG. 1 is a block diagram of components of a communications network system.

Referring to FIG. 1, shown is a communications network system 6 for facilitating the delivery of network traffic 7 (e.g. content distribution) between a series of network devices 9 coupled to the network(s) 14,16,18 (e.g. one or more networks that can be logical and/or physical network configurations). Described is a general approach for handling client network traffic 7 (e.g. traffic 7 received or otherwise transmitted from a network device 9 such as but not limited to DNS resolvers) using a combination of network 14,16,18 (e.g. Internet-wide) anycast service distribution and partner-specific interconnects, referring to network interfaces 34,36 as further described below. The network devices 9 can include source devices 8 that generate source traffic 30, which can be communicated directly to responder servers 10 and/or communicated indirectly by being directed to the responder servers 10 via requester servers 12 that act on behalf of the source devices 8 for communicating the source traffic 30 to the responder servers 12. In general, the source traffic 30 can be referred to as network request traffic 30 (e.g. a query) that makes its way over the communications network(s) 14,16,18 to the responder server 10, which ultimately is responsible for processing the network traffic request 30 and generating an appropriate network traffic response 32 (e.g. a query response). It is recognised that the communications network system 6 is configured with service infrastructure facilitating the practical matter of responding to client queries (e.g. network traffic 7) and the associated data collection using data collection system 50 (see FIG. 2), further described below. In particular, data analysis executed by the data collection system 50 is provided on traffic data 38 (e.g. pairings data 38—see FIG. 1), supplied by the data collection capabilities of the data collection system 50. The data analysis and subsequent dynamic generation of the pairings data 38 is used by the communications network system 6 (e.g. data management system 52—see FIG. 2) to providing insight and opportunities for automatic/manual management of inbound network traffic 7 (e.g. request such as but not limited to DNS queries) via one or more prioritization criteria 39 that are associated with the pairings data 38, as further described below. It is recognised that the systems 50,52 can be referred to as a traceability system 53, which can be hosted on a separate server 55 and/or on the responder(s) server 10 as desired.

Examples of requester servers 12 can include servers such as but not limited to: public DNS resolver operators (e.g. Google™ Public DNS) which can be a source of resolver traffic with significant dependent end-user communities; application service provider (e.g. Facebook™) which supply social media services; and application service provider (e.g. Cloudflare™) which provide HTTP-layer session termination for downstream web properties; and application service providers which provide services to end-users over the Internet which make use of web-based APIs and user interfaces. Other examples of requester servers 12 can include servers such as but not limited to: those operated by access providers (also referred to as Internet Service Providers such as Comcast™) operated servers (e.g. DNS resolvers) coupled to network source devices 8 such as IoT devices; and cloud provider (e.g. Amazon™, Digital Ocean™) operated servers coupled to network source devices 8 such as tenant environments containing connected source devices 8 operated by their customers. It is recognised that the network traffic 7 receipt and/or processing capabilities (e.g. traffic handling and processing capacity) of the responder server(s) 10 and/or other portions of the responder network 18 (e.g. one or more network devices 22) can become strained due to an unexpected and periodic spikes in the amount of network traffic 7 experienced. One example of an unexpected spike in network traffic 7 can be because of a denial of service attack directed to the responder network 18 and/or specific responder server(s) 10 in general. The unexpected spike can affect quality of service (e.g. response time) for receiving, processing and sending an appropriate network response traffic 32 to received network request traffic 30. In these situations, it is preferred that the affected portion(s) of the responder equipment can mitigate the strained resource capacity by prioritizing the received network traffic 7, which thereby facilitates optimization of the resource capacity of the responder equipment. For example, in a DNS environment, acceptable timing for a response 32 to a received DNS query 30 can be on the order of 15 ms or less.

The communications network of the communications network system 6 can comprise one or more networks 14,16,18 suitable for transferring data (i.e. network request traffic 30, network response traffic 32) from one network device 9 to another. Preferably, the communications network 11 comprises a wide area network such as the public network 16 (e.g. the Internet) and one or more local area networks e.g. a requester network 14 and a responder network 18. It is recognised that the network(s) 14,16,18 can be a single or multiple networks as desired configured between any pair of network devices 9. For example, the requester server 12 and the responder server 10 can be on the same or different network(s) 14,16,18 (i.e. one or more). Further, the network(s) 14,16,18 need not be a land-based network type, but instead can comprise wireless network type and/or hybrid of a land-based network type and a wireless network type for enhanced communications flexibility. For example, the communications network(s) 14,16,18 can also include Bluetooth™ associated elements. It is recognised that the network devices 9 can communicate with one another via the network(s) 14,16,18 in client-server relationships. For example, the requester network 14 can comprise one or more local network devices 20 (e.g. routers, hubs, switches) acting as network components owned by the entity operating the requester server(s) 12 and used to connect the computers or other electronic devices (e.g. devices 8,12) together so that they can exchange files or resources (e.g. the network traffic requests 30 and responses 32) with one another. For example, the responder network 18 can comprise one or more local network devices 22 (e.g. routers, hubs, switches) acting as network components owned by the entity operating the responder server(s) 10 and used to connect the computers or other electronic devices (e.g. devices 10, storage 24 such as a database) together so that they can exchange files or resources (i.e. the network traffic requests 30 and responses 32) with one another. For example, the public network 16 can comprise one or more global network devices 20 (e.g. routers, hubs, switches) acting as network components owned by one or more entities operating the wide area network 16 (e.g. the Internet) and used to connect the computers or other electronic devices (e.g. 20,22) together so that they can exchange files or resources (i.e. the network traffic requests 30 and responses 32) with other networks 14,18 coupled to the wide area network 16. As such, it is recognised that one or more of the local network devices 20 can be on the periphery/border of the requester network 14 and are used as a bridge for network traffic 7 between the networks 14,16. As such, it is recognised that one or more of the local network devices 22 can be on the periphery/border of the responder network 18 and can be used as a bridge for network traffic 7 between the networks 16,18.

For example, the network 16 can have sub-network 16*a* containing network devices 21 that function as bridge devices between the networks 16,18. As such, a traceability system 51 associated with the responder servers 10 can implement some level of control/suggestion (e.g. prioritization command 40—see FIG. 2) over the operation of those devices 21 in the sub-network 16*a*. Similarly, the network 18 can have sub-network 18*a* containing network devices 22 that function as bridge devices between the networks 16,18. As such, a traceability system 51 associated with the responder servers 10 can implement some level of control/suggestion (e.g. prioritization command 40—see FIG. 2) over the operation of those devices 22 in the sub-network 18*a*.

It is recognized that the source/request traffic 30 and the response traffic 32 are forms of the generic network traffic 7. For example, the source/request traffic 30 can be referred to as network traffic sent over the local requester network 14 and the response traffic 32 can be referred to as network traffic received over the local requester network 14. The response traffic 32 can be referred to as network traffic sent over the local responder network 18 and the request traffic 30 can be referred to as network traffic received over the local responder network 18. The request/response traffic 30,32 communicated (both sending and receiving—in effect transferring from one network 14,18 to another) over the wide area network 16 (e.g. the public network or Internet) can be referred to as general network traffic 7.

One example of the communications network system 6 can be the responder server 10 acting as an authoritative name server 10 for providing responses 32 to Domain Name Server (DNS) queries 30, such that the requester servers 12 are DNS resolver servers acting as a local server for managing the DNS requests 30 for all clients (e.g. end users such as the source devices 9) on their local network (e.g. requestor network 14). In this example, it is recognised that authoritative name servers 10 can store DNS resource record information—for example IP addresses and mail exchangers for e-mail delivery in a database 24. Recursive/resolver name servers 12 can be referred to as "middlemen" between the authoritative servers 10 and the end-user devices 8 (e.g. a web browser) because the recursive/resolver name servers 12 recurse down a DNS tree to reach the name servers authoritative for storing the requested domain's records. The domain name space can consist of the tree data structure, such that each node or leaf in the tree has a label and zero or more resource records (RR), which hold information associated with the domain name. The domain name itself can consist of a number of parent-child labels, each child label concatenated with the name of its parent node on the right, separated by a dot.

The network traffic 7 can be implemented as a data exchange model or as a packet exchange model. In general, the query 30 can be a request for information from the database 24. There can be a number of different methods used by the source device 8 for posing the queries 30. for example: a) choosing parameters from a menu as the system presents a list of parameters from which to choose; b) query by example (QBE) as the system presents a blank record and lets one specify the fields and values that define the query 30; and/or query language as the system requires one to make requests for information in the form of a stylized query that must be written in a special query language. The described request-response, or request-reply, message exchange is used by the devices 8 and servers 10,12 to communicate with each other over the network(s) 14,16,18, in which the first computer sends the request 30 for some data and the second computer responds 32 to the request 30. There can be a series of such interchanges until the complete message is sent, such as for example browsing a web page. As such, the request 30-response 32 message exchange pattern described can be referred to as the manner in which a requestor (e.g. source device 8) sends a request message 30 to a responder system (e.g. responder server 10 or requester/responder servers 12,10 working in tandem) which receives and processes the request, ultimately returning a response message 32. The request 30-response 32 messaging provides for a messaging pattern which allows two applications (executing on the requisite network devices 9) to have a two-way conversation with one another over a channel (i.e. over one or more network(s) 14,16,18), as a client-server relationship.

For simplicity, this client-server relationship can be typically implemented in a purely synchronous fashion, such as in web service calls over HTTP, which holds a connection open and waits until the response is delivered or the timeout period expires. However, request 30-response 32 can also be implemented asynchronously, with a response being returned at some unknown later time, which can be common in enterprise application integration (EAI) implementations where slow aggregations, time-intensive functions, or human workflow must be performed before a response can be constructed and delivered.

An recursive DNS query is a request for DNS resource records that are used by applications for reasons including but not limited to the process of following a uniform resource locator (URL) that the domain name system (DNS) requester server 12 responds to with the resource records (e.g. IP address) from its cache, if possible. If the requester server's 12 cache does not contain the resource records requested at the time of the request, the requester server 12 originates requests 32 to one or more responder servers 10. Each responder server 10 may respond with a positive or negative response, or may respond with a referral which indicates to the requester server 12 the name of a different responder server 10 that the requester should send a request to. This process continues until the requester server 12 obtains an answer or until a failure condition becomes apparent. All responses received by requester servers 12 from responder servers 10 are generally stored by requester servers 12 in a local cache.

In terms of the DNS based example, the queries 30 and responses 32 can be packet-based communications following the DNS protocol using the two types of DNS messages, i.e. queries 30 and replies 32, both having the same format. The precise format of a DNS message was originally specified in RFC 1035 and clarifications and enhancements to the message format have been specified in subsequent technical documents published in the RFC series by the Internet Engineering Task Force (see P. Mockapetris, "DOMAIN NAMES—IMPLEMENTATION AND SPECIFICATION", RFC 1035, November 1987, https://www.ietf.org/rfc/rfc1035.txt). Each message can consist of a header and sections: Question, Answer, Authority, and Additional. The header contains various parameters that relate to the sections of the messages which follow it. In general, the header section contains the following fields: Query ID, Flags, the number of entries in the Question section, the number of entries in the Answer section, the number of entries in the Authority section, and number of entries in the Additional section. The Query ID field can be used by the requester servers 12 to match responses with queries. The flag field can consist of several sub-fields. The first can be a single bit ("QR") which indicates if the message is a query (0) or a reply (1). The second sub-field can consist of four bits which together form a value that describes the purpose of the DNS message ("OPCODE") which is generally 1 meaning "query" for query traffic between requester servers 12 and responder servers 10 but for which other values exist for other purposes. A single-bit sub-field ("AA") can indicate if the contents of the Answer section in a response from a DNS server 10 should be considered authoritative by the Requester Server 12 which receives the response. Another single-bit sub-field can indicate if the client (device 8,12) wants to send a recursive query ("RD"). The next single-bit sub-field can indicate if the replying DNS server 10 supports recursion ("RA"), as not all DNS servers are configured to do this task. Another sub-field can indicate if the request 30 was truncated for some reason ("TC"), and a four-bit sub-field indicates status. The Question section can contain the domain name ("QNAME"), type of record (A, AAAA, MX, TXT, etc.) ("QTYPE") and the class of name ("QCLASS") which for names resolved for use on the Internet is usually IN. The domain name can be broken into discrete labels which are concatenated; each label is encoded in the wire format of the DNS message as the length of that label followed by the label itself, or as a pointer to another encoding of a domain name in the same message, a mechanism known as label compression which can help reduce the size of DNS messages. The Answer section can contain resource records relating to the query described in the Question section. A single domain name can have multiple resource records of the same or different types associated with it. The Authority and Additional sections contain additional information that is relevant to the type of response being returned from a responder server 10 to a requester server 12. The mechanisms by which DNS messages are constructed and interpreted by servers that communicate using the DNS protocol were originally specified in RFC 1034 (see—P. Mockapetris, "DOMAIN NAMES—CONCEPTS AND FACILITIES", RFC 1034, November 1987, https://www.ietf.org/rfc/rfc1034.txt) and clarifications and enhancements have been specified in subsequent technical documents published in the RFC series by the Internet Engineering Task Force. One example of the requests 30 can be recursive requests used to return information from servers 10 that do not contain sufficient authoritative data locally to be able to supply a response with an answer to the question from the requester server 12. For example, the DNS server 10 can respond to iterative queries 30 that it has no local information for through referral. The referral points to another DNS server 10 that is authoritative on a domain namespace and those for lower and lower levels of a domain space. The referrals can continue until the appropriate DNS server 10 is found that is authoritative to the queried site or until an error is returned or a time out is reached. At the level of root DNS, all authoritative servers 10 and their availability are crucial to the function of the Internet. A requester server 12 which sends a request 32 to a responder server 10 but which does not receive a response, e.g. because the request or response was dropped due to capacity limitations of the networks 22, 21, 20 between them, is generally able to try a different but equivalent responder server 10. The general mechanisms by which requester servers 12 and responder servers 10.

Referring again to FIG. 1, shown is a multi-interface configuration between a responder server 10 and a requester server 12, such that a private service interface 34 and a separate public service interface 36 are provisioned between the responder server 10 and the requester server 12. The private service interface 34 is provisioned as a direct interconnect on the communications network 14,16,18 between the responder server 10 and a predefined requester server 10 for a specified source (e.g. source device 8) of the request traffic 30. The direct interconnect provides the private service interface 34 for receiving the network query request traffic 30 addressed from the predefined source (e.g. source device 8), such that a defined pairings data 38 of the predefined source with the direct interconnect is stored in the database 24 containing pairings data 38 including source-connection relationships for the network traffic 7, also referred to as a network traffic almanac. For example, the set of pairings data 38 referred to collectively as the network traffic almanac is, in effect, the resultant signal analysis (i.e. pairings data 38) of historical network traffic 7 data received (as facilitated by the data collections system 50) from the predefined network source devices (e.g. source device 8, requester server 12) relating to identified source addresses on the network 14,16,18 of the network traffic 7, the interface 34,36 used to receive by the responder server 10 the network traffic 7, as well as other identified header and/or payload parameters of the network traffic 7 as desired. The pairings data 38 is then used by the data management system 52 (see FIG. 2) as an extrapolation tool for subsequently received network traffic 7 as predictions of how network traffic 7 patterns (e.g. request type, source address, designated interface 34,36, etc.) will go in the future based on the past identified behaviour (as resident in the pairings data 38). The data management system 52 is configured to interrogate the pairings data 38 of the network traffic almanac in real time in order to ascertain or otherwise identify which of the network traffic 7 arriving on the interface(S) 34,36 can be classified as normal or abnormal. The pairings data 38 is, in essence, a prediction of what a normal category of network traffic 7 is and/or deviations from a normal category of network traffic 7, i.e. an abnormal category of network traffic 7. As such, the pairings data 38 can contain network traffic parameters defining normal network traffic 7 (i.e. desired network traffic 7 such as but not limited to network traffic 7 from the predefined requester server 12 arriving on the designated private network interface 34 assigned to the network traffic 7 of the specified requester server 12). As such, the pairings data 38 can contain network traffic parameters defining abnormal network traffic 7 (i.e. undesired network traffic 7 such as but not limited to network traffic 7 from the predefined requester server 12 arriving on the undesignated public network interface 36 rather than the designated private network interface 34 assigned to the network traffic 7 of the specified requester server 12). As such, the pairings data 38 can contain network traffic parameters defining both the normal network traffic 7 (i.e. desired network traffic 7 such as but not limited to network traffic 7 from the predefined requester server 12 arriving on the designated private network interface 34 assigned to the network traffic 7 of the specified requester server 12) and network traffic parameters defining abnormal network traffic 7 (i.e. undesired network traffic 7 such as but not limited to network traffic 7 from the predefined requester server 12 arriving on the undesignated public network interface 36 rather than the designated private network interface 34 assigned to the network traffic 7 of the specified requester server 12). Accordingly, the pairings data 38 in the network traffic almanac can be considered a prediction of what normal and/or abnormal network traffic 7 will look like, as identified by the data management system 52 by comparing in real time the received network traffic 7 on the selected interface 34,36 with the pairings data 38 stored as the network traffic almanac in the storage 24. Using the stored pairings data 38 as a network traffic baseline, the data management system 52 can identify anomalies, perform targeted forensic analysis on the network traffic 7 and derive mitigations.

The public service interface 36 is provisioned for receiving the network request traffic 30 addressed from the predefined source as well as from other sources, the public service interface 36 separate from the private service interface 34. The storage of the defined pairing(s) data 38 provides the network traffic almanac, such that network request traffic 30 coming over the private service interface 34 from the predefined source is considered "clean" while network request traffic 30 coming over the public service interface 36 from the predefined source can be considered "suspect" or otherwise compromised. As further described below, the responder server 10 (or a service acting on behalf of the responder server 10 as consulted by the responder server 10) utilizes/consults the information of the defined pairing(s) data 38 in which to base prioritization actions on any network request traffic 30 from the predefined source received over the public service interface 36, such that the set of defined pairing(s) data 38 can be referred to as the network traffic almanac for a partner requester server 12/network 14 of the responder server 10.

In terms of separateness, the private service interface 34 is defined as a separate and dedicated path over the network 14,16,18 as compared to the public service interface 36, which facilitates one or both of: (a) the ability to identify a considered clean flow of network request traffic 30 from a reliably-known originator (i.e. the requester server 12 coupled to the private service interface 34), and (b) the ability to accommodate that flow of network request traffic 30 with dedicated network capacity attributed to the private service interface 34. For example, a direct interconnect with a partner server 12/network 14 could achieve both (a) and (b) in the case where the direct interconnect is coupled to the requester server 12 itself and/or in a specified location in the partner network 14 so that the responder server 10 can be confident the private service interface 34 would only carry clean network traffic 7 (then (a) is achieved the fact of the dedicated service interface achieves (b)). Alternatively, constructing a virtual interconnect (e.g. a tunnel, like a VPN) between the partner server 12/network 14 and the responder server 10 could achieve (a) but might not be as effective for (b) if, for example, the VPN traffic is carried in the same network circuits that is used for other network traffic (given the possibility that the other traffic could swamp the VPN traffic). Alternatively, deploying a dedicated responder server 10 into the partner's network 14 could achieve (a) and (b), given a deployment that only received clean request traffic 30 and hence achieves (a), and in this case the entire responder server 10 would be dedicated to the partner's use which could satisfies (b).

One example type of the private network interface 34 can be the direct interconnect configured as is a physical interconnect (e.g. a direct layer-2 or layer-3 interconnect) between the responder server 10 and the requester server 12. A further type of the private network interface 34 can be the direct interconnect configured as a logical network connection on the network 14,16,18 between the responder server 10 and the requester server 12.

As such, when considering the objective of moving fresh data records from a data store 24 of the responder server 10 into the caches of requester servers 12 (e.g. a DNS-specific objective of moving fresh resource record sets from an authority data store 24 into the caches of DNS resolvers 12), there can be a number of alternatives/embodiments for implementing transfer mechanisms of the network traffic 7 between the servers 10,12 (e.g. general-purpose (IP-layer) interconnects) as the predefined private network interface 34 assigned/provisioned between the servers 10,12. For example, direct layer-2 interconnects 34 between networks 14,16,18 can be provisioned as part of peering relationships, e.g. direct cross-connects, mutual presence at peering fabrics or hypervisor-level interfaces. It is recognised that the general nature of the direct interconnect 34 can use some architectural consideration in order to provide that the resulting channel (i.e. private network interface 34) is not subject to pollution from attack traffic sources 12.

A further, DNS-specific refinement of this general physical approach for the private network interface 34 can follow the same approach used for anycast deployment of an authoritative service (i.e. responder server 10)—rather than adding connectivity to the border of a single, internally-connected service delivery network, replicate the content being distributed to multiple, disconnected service delivery nodes and interconnect each one separately. In effect, every deployment of a new anycast node in somebody else's network is indistinguishable from a private cross-connect in the deployment location, the enclosing network being used for data replication as a substitute for internal connectivity.

A further example of the private network interface 34 can be using discrete and identifiable transport without a dedicated IP-layer path affording some of the benefits of direct interconnection without the infrastructure costs. For example, an arrangement with a particular requester server 12 operator to encapsulate all network traffic 7 intended for responder operated responder servers 12 in tunnels provides a virtual interconnection interface 34 at the responder network 18. For example, the analogous arrangement at the DNS layer might be the use of persistent TCP bundles to transport request 30 and response 32 messages, which in effect moves the interconnection 34 inwards by one shell to the nameserver infrastructure (e.g. responder server 10). In these cases, the ability of the data management system 52 to classify traffic and signal abnormality in the network traffic 7 that does not follow the expected network path (the assigned interface 34) is retained.

It is recognised that following an application-specific description of the requester-responder server interaction, engagement between specified requester network(s) 14 and responder network(s) 18 (i.e. partners) can facilitate partner- and application-specific arrangements that are not constrained by the need for general interoperability and ruthless adherence to public standards. The following two embodiments are examples of private network interfaces 34, for example useful in the context of attack traffic 7 mitigation:

The first embodiment is replacement/modification of the network address referral mechanism, by which iterative server identities are disseminated by parents. By preserving the use of the defined communication protocol (e.g. DNS) between requester server 12 and responder server 10 but providing a robust set of available responder servers 10 that are partner-specific (as assigned to specified requester server(s) 12) and not generally announced (i.e. their network 14,16,18 address is not publicized to anyone but the specified requester server(s) 12), attack targets on the responder infrastructure (e.g. devices 22, servers 10 and/or other portions of the network 18) are obscured to outsiders (i.e. non-partners) and potentially dynamically variable. In other words, the considered private network 14,16,18 address of the responder server 10 (i.e. as shared only between the requester 14 and responder 18 networks) and use thereof for sending the request network traffic 30 can be referred to as an example of the private network interface 34.

An alternative second embodiment would be to replace the mechanism used for cache population by the requester servers 12, providing alternatives to the general-purpose (e.g. DNS) protocol which fill in some of the gaps in admission control and signalling left by the protocol's fundamental requirement to serve unknown clients in a stateless way. Pre-population of caches can reduces the time-criticality of such a protocol and can enable a more conventional distributed systems approach, such as the use of distributed hash tables and/or distributed (private) public ledgers (block-chain) as an example configuration for the private network interface 34.

In view of the above, it is recognised that the provisioning of the private network interfaces 34 can be accomplished by any specified responder server 10 to a plurality of assigned requester servers 12, for example having a separate and respective private network interface 34 provisioned between the common responder server 10 and each of the assigned requester servers 12. It is recognised that the private network interface 34 can be used to assign the requester server 12 to the responder server 10 or vice versa. Also, each of the provisioned private network interfaces 34 would have a corresponding set of pairings data 38 in the network traffic almanac stored in the storage 24. In this manner, for a plurality of different private network interfaces 34 utilized by a common responder server 10, the data management system 52 could organize or otherwise associate each set of pairings data to a corresponding private network interface 34. Further, it is recognised that a particular private network interface 34 can be associated with two or more designated individual requester servers 12 (and/or requester networks 14), i.e. individual meaning controlled by different entities/operators as identified by differing source network addresses for example. It is also recognised that for the case where two or more designated individual requester servers 12 (and/or requester networks 14) share a common private network interface 34, the pairings data 38 for each of the individual requester servers 12 (and/or requester networks 14) can be differentiated by using different prioritization criteria 39 for each of the two or more designated individual requester servers 12 (and/or requester networks 14). One example of utilizing a shared private network interface 34 for two or more designated individual requester servers 12 (and/or requester networks 14) can be where different time zones are established for the two or more designated individual requester servers 12 (and/or requester networks 14) and hence it would be expected that the network traffic 7 for each of the two or more designated individual requester servers 12 (and/or requester networks 14) would have different peak timing upon arrival to the responder server 10.

Further to the below, it is recognised that it is important for the purposes of the network traffic almanac (i.e. generating and maintaining the set of defined pairings 38) and making appropriate prioritisation decisions on the network request traffic 30 (i.e. received on or otherwise directed to the public network interface 36) is where the network request traffic came from (i.e. the predefined source). As such, it is recognised that any network request traffic 30 arriving through the private network interface 34 (and its priority in processing in formulating the appropriate network response traffic 32) is considered of different importance than which path the network response traffic 32 is sent. For example, the network request traffic 30 can be received on the private network interface 34 and the network response traffic 32 could be sent out on the same private network interface 34. Alternatively, the network request traffic 30 can be received on the private network interface 34 and the network response traffic 32 could be sent out on the different public network interface 36. However, it is recognised in general that responses can be usually larger than requests, and since service quality of response delivery can also be important, preferably the private network interface 34 would be used to send the network response traffic 32 associated with the received network request traffic 30. It is also recognised that use of a dedicated path for the network response traffic 32 may not be the right choice for all situations, e.g. if one has delayed upgrades on a private network interface 34 due to some unexpected hurdle and there is insufficient capacity for one to send responses in that direction safely. So in general it is expected there could be cases in which one would send the response network traffic 32 in a network 14,16,18 path direction other than the one used to receive the network request traffic 30, due to operational considerations.

In terms of generation and usefulness of the network traffic almanac (i.e. the set of defined pairings 38), in general the network 14,16,18 framework for packet-based communications (e.g. network traffic 7) provides difficulties in confirming the traceability of a network request traffic 30 received (e.g. over UDP for a DNS query 30). A significant motivation for set-up and implementation of the multi-interface 34,36 configuration is using any observed differences (as incorporated into the generated and subsequently stored predefined pairings 38) between the considered dirty-channel public service interface 36 and the considered clean-channel private service interface 34 to better predict when a received network request traffic 30 was not sent from the network address that appears as the "source" in the packet header. This provisioning and subsequent use of the clean private service interface 34 affords a means of predicting the path by which legitimately-sourced packets appear; if similarly-sourced packets arrive unexpectedly on a public service interface 36, i.e. not following the source-interface definition in the predefined pairings 38 as consulted, the responder server 10 can make a prediction (i.e. decide) that the similarly-sourced packets arriving on the public service interface 36 are not traceable and therefore must be deprioritized (e.g. dropped). It is recognised that simple peering relationships don't come with the expectation that traffic arriving over a direct link is clean, as that traffic is not application-specific and it can be generally difficult to infer motivation. In the case of the communications network system 6, utilizing the multi-interface configuration in conjunction with the network traffic almanac, the responder server 10 would expect only specified kinds of network request traffic 30 over the direct private network interface 34 (as defined by the predefined pairings 38), and the responder server 10 could further expect the network request traffic 30 over the direct private network interface 34 to be clean by careful arrangements with the partner requestor server 12. To the extent that the path defined by the private network interface 34 is operated cleanly, as described herein, this affords the responder server 10 the opportunity to learn what clean network traffic 7 is, and by consequence identify obvious suspect or considered dirty network traffic 7 in non-clean data sets. Accordingly, in essence, a key component of the construction and maintenance of the network traffic almanac, by generating and maintaining/updating the pairings data 38, enables the categorization (i.e. normal/abnormal) of network traffic 7 arriving on a selected network interface 34,36. It is recognised that the public network interface 36 is considered to have a greater potential of abnormal network traffic 7 and therefore it is the network traffic 7 of the public network interface 36 that can preferably be analyzed by the data management system 52. It is also recognised that the private network interface 34 can be considered to have a greater potential of normal network traffic 7 and therefore it is the network traffic 7 of the public network interface 36 that can typically be ignored by the data management system 52 is seeking to identify and de-prioritize abnormal network traffic 7. However it is recognised that the data management system 52 can also analyze the network traffic 7 on the private network interface 34 in order to identify abnormal (or otherwise to check that the arriving network traffic 7 is deemed normal via consultation/comparison with the pairings data 38 of the network traffic almanac).

Accordingly, alongside the shift of expected/predefined network traffic 30 from the public network interface 36 to the private network interface 34 (as defined by the pairings data 38), the existence of private network interface 34 provides additional opportunities to manage traffic received through the public network interfaces 36. For example, query traffic 30 received from the Internet 14,16,18 using stateless transport, ostensibly from a requester server 12 (e.g. resolver operator with whom the management system 52 has a functioning/defined/provisioned private network interface 34 is probably spoofed. The query traffic 30 patterns (e.g. content and/or timing) observed over private network interfaces 34 (which are far less likely to see attack network traffic 7) are more likely to be indicative of real end-user behaviour of the requester server 12 using the private network interface 34, facilitating the generation and updating of the traffic models represented by the pairings data 38 to better characterise network traffic 7 seen in general (i.e. over all interfaces 34,36) by the responder server 10 from the network 14,16,18.

Prioritization of network traffic 7 can be defined as allowing or otherwise ignoring (and therefore not affecting) the receipt of the network traffic 7 by the responder server 10 and the associated network devices 22 of the responder network 18, for example network request traffic 30 arriving from the predefined requester server 12 on the assigned private network interface 34 is prioritized, i.e. desired and therefore left alone to be processed by the responder server 10 in formulating and sending out the appropriate network response traffic 32. On the contrary, de-prioritised network traffic 7 is achieved by dropping the network traffic 7 (e.g. packets) that are of considered lower priority (i.e. those network traffic 7 that are deemed in consultation with the pairings data 38 to be classified or otherwise categorized as abnormal and therefore undesired network traffic 7). Hence, the surviving network traffic 7 (against which no prioritization action was taken) are considered "prioritised". Prioritisation can therefore be referred to as a passive act—being ignored by the data management system 52 ensures the survival and subsequently formulated response traffic 32 by the responder server 12. It is the ignoring of desired network traffic 7 that is utilized preferably by example as prioritization in the following described configuration and operation of the responder server 12, the data collection system 50 and the data management system 52.

Figure 2:
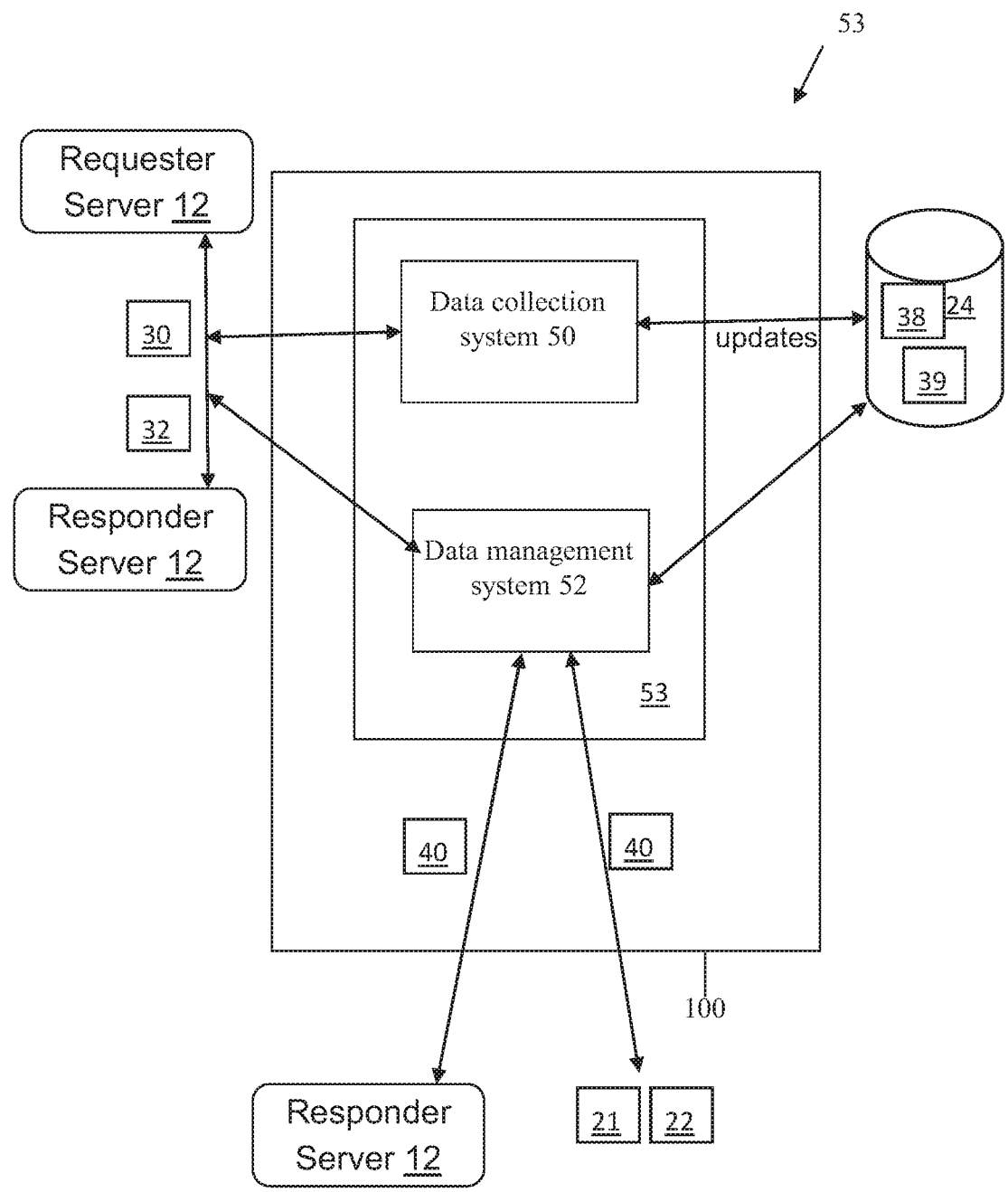
FIG. 2 is a block diagram of an example traceability service for the system of FIG. 1.

Referring to FIG. 2, shown is a traceability service 53 for use in monitoring by the data collection system/module 50 the network traffic 7, for generating or otherwise updating the pairings data 38 and/or prioritization criteria 39 of the network traffic almanac. Further, the traceability service 53 can also include the data management system 52 for use in identifying the network traffic 7 as normal/abnormal (in consultation with the data pairings 38 of the network traffic almanac, as well as in implementing prioritization criteria 39 or suggesting such prioritization criteria 39 to the responder server 10. Further, the data management system 52 can be configured for sending the prioritization command(s) 40 to the network devices 21,22 (as well as responder server(s) 10) as a result of the consultation.

However it is recognised that alternatively, prioritization of network traffic 7 can be defined as denying or otherwise blocking/dropping (and therefore affecting) the receipt of the network traffic 7 by the responder server 10 and the associated network devices 22 of the responder network 18, for example network request traffic 30 arriving from the predefined requester server 12 on the public network interface 36 is prioritized, i.e. undesired and therefore dropped or otherwise restricted from being processed by the responder server 10 in formulating and sending out an appropriate network response traffic 32. On the contrary, de-prioritised network traffic 7 is achieved by ignoring the network traffic 7 (e.g. packets) that are of considered higher priority (i.e. those network traffic 7 that are deemed in consultation with the pairings data 38 to be classified or otherwise categorized as normal and therefore desired network traffic 7). Hence, the surviving network traffic 7 (against which no prioritization action was taken) are considered "de-prioritised". Prioritisation can therefore be referred to as an active act—being acted upon by the data management system 52 ensures the blocking/dropping and subsequent inhibiting (or otherwise avoidance) of a formulated response traffic 32 by the responder server 12.

Referring again to FIGS. 1 and 2, the data management system 52 provides opportunities for dynamic network traffic 7 classification that can be implemented alongside predefined pairings data 38 (as well as updates to the pairings data 38 as further described below), and opportunities to dynamically identify and handle unwanted network traffic 7 (or otherwise prioritise network traffic 7 in a constrained network 14,16,18 capacity scenario) based on the resulting derived data sets represented by the predefined pairings data 38. Accordingly, the data management system 52, in conjunction with utilization of the multi-interface 34,36 with generation/updating of the associated pairings data 38 by the data collection system 50, provides a general-purpose approach for handling (e.g. dropping) deemed unwanted/spoofed network traffic 7 that is driven by decisions informed by use of the pairings data 38 (e.g. the network traffic almanac).

For example, the responder server 10 receives a first request traffic 30 addressed from the predefined source device 8 via the private network interface 34 and then processes the first request traffic 30 by generating a first response 32 and sending the first response 32 via network 14,16,18 (e.g. using the private network interface 34 or the public network interface 36) for communicating over the network 14,16,18 to the predefined source device 8 (e.g. via the requester server 12). Subsequently, the responder server 10 receives a second request traffic 30 having an address of the predefined source device 8 via the public service interface 36, consults the source connection database 24 with the address to determine the second request traffic 30 matches the predefined source as defined in the predefined pairing(s) 38, and de-prioritizes (e.g. drops) processing of the second request traffic 30 based on the second request traffic 30 being received on the public service interface 36 rather than on the direct interconnect of the private network interface 34 by dynamically applying a prioritize criterion to the second request traffic with respect to generating a second response 32. It is recognised that the second response 32 can be a null response (e.g. the decision not to generate a response having received a query). As such, a null response can be a form of de-prioritization. Further, for example, there can be multiple opportunities to de-prioritize (e.g. drop) an inbound network request traffic 30 (recognising that by example prioritise means "not drop" the traffic received over the private network interface 34 by giving such traffic a deemed higher priority as one class of network traffic while achieving efficiencies in network traffic processing by taking action, such as dropping, on a subordinate class of network request traffic 30 received on the public network interface 36).

In terms of the one or more prioritize criterion, there are a number of options that can be used to capitalize on the fact that the network request traffic 30 was expected on the private network interface 34 but received on the public network interface 36 (as identified in consultation with the network traffic almanac stored in the database 24). The responder server 10 would de-prioritise traffic most usually on shared/public interfaces 36 through which the responder server 10 expects to receive considered dirty traffic. Direct interconnects of the private network interface 34, on which the traffic is considered clean (or at least cleaner that the public network interface 36) and whose capacity is considered easier to manage are less likely to need active de-prioritisation (e.g. dropping of the requests by failing to provide a corresponding response). For example, one prioritize criterion would be to implement some action outside of the responder network 18, in the network 16 such as using the devices 21 in the sub-network 16a. This can be the most efficient place to drop an inbound request traffic 30 since at this point the request traffic 30 has not consumed any of the network capacity of the responder network 18 (e.g. for example the processing resources of the responder server 10), since the request traffic 30 is still in someone else's network. Facilities to drop request traffic 30 in the requester network 14 could be with criteria (e.g. of the form "drop all traffic that claims to be from source address X" or "drop all traffic that is directed at nameserver address Y" or some combination thereof) sent as a prioritization command/suggestion 40 to the network device(s) 21 of the sub-network 16a. It is anticipated that the network device(s) 21 of the sub-network 16a would receive, store and subsequently utilize the prioritization command/suggestion 40 by dropping any network request traffic 30 received from the identified source device 8, is directed to the responder server 10, or any combination thereof. Alternatively, the prioritization command/suggestion 40 could be provided to a network device 22 of the responder sub-network 18a. It is anticipated that the network device 22 of the responder sub-network 18a would receive, store and subsequently utilize the prioritization command/suggestion 40 by dropping any network request traffic 30 received from the identified source device 8, is directed to the responder server 10, or any combination thereof.

A further example prioritization action can be implemented further in the responder network 18, i.e. past the network edge represented by the sub-network 18a, using network device(s) 22 (e.g. routers, switches) in the responder network 18 proper. At this point the network request traffic 30 has already consumed network capacity between the responder server 10 and the requester server 12, but network request traffic 30 has not yet consumed resources on the responder server 10 itself or on the full internal network 18 path between our provider edge (e.g. interface between the networks 16,18 and the responder server 10 itself. Dropping queries at this location in the responder network 18 proper, utilizing the network device(s) 22 so configured, may not be as effective as dropping them upstream, but considered better than letting the network request traffic 30 flow through to the responder server 10 itself. In this example, the routers 22 of the responder network 18 could be optimised to handle larger floods of traffic than the servers are, so protecting servers with routers can be beneficial. Accordingly, the network device(s) 22 (e.g. routers) can be configured by the prioritization command/suggestion 40, as received, to identify network request traffic 30 to drop with a richer vocabulary than we can send upstream to the requester network 14, so there is potential to drop network request traffic 30 in the responder network 18 with greater granularity. For example, the de-prioritize criteria can include such as but not limited to: dropping network traffic 7 based parameters carried in the network traffic 7 (e.g. packet) other than source and destination address, e.g. UDP source, destination port, protocol, and/or rate-limiting criteria as well as a simple discard action.

A further example prioritization action can be implemented in the responder server 10 itself. At this point the network request traffic 30 has consumed all the resources it can possibly consume, but the responder server 10 still has the potential to drop the network request traffic 30 received on the public network interface 36 and thereby avoiding generating a substantive network response traffic 30 which will consume more resources on its way out on the responder network 18. At the responder server 10, one can drop using all the criteria before and also additional DNS-specific criteria, for example DNS-specific parameters found within the reassembled DNS network request traffic 30 messages (e.g. packets). One option of prioritization action would be to distinguish between a query for a particular unsavoury domain name associated with malware and another query that is benign from identical clients. Avoiding the generation of responses to malicious queries (i.e. whose source addresses have been set to the addresses of third-party attack target systems) could also protects other potential victims on the network 14,16,18 for whom the response might have been intended as attack traffic (this is the essence of a "reflection attack"). For example, plausible examples include using DNS parameters such as DNS query name ("QNAME") or query type ("QTYPE") in the set of criteria used to match traffic to drop. For example, a single requester server 12 might send the responder server 10 many queries relating to real activities by end-users, but might also send us queries with QTYPE=NULL which is a technically valid value, but almost never seen as a result of end-user activity. Another example are queries with QNAME that match a DGA (a generated domain name) which are invariably directly associated with malware.

By understanding what clean traffic looks like we can better understand the impact of making drop decisions in each of these three different areas, and reduce the risk that a decision to drop traffic in any particular way will have collateral impact on other, legitimate traffic. The net effect is to improve the quality of legitimate traffic.

Referring to FIG. 2, collection and analysis of inbound network traffic 7 by the data collection system 50 to responder servers 12 (e.g. authoritative name servers) over a period of time can reveals a smaller number of very active network sources (e.g. request servers 10 acting as data sources directing their network traffic 7 to the responder servers 10). Analysis of network request traffic 30 shows a distribution of network traffic 7 type, source/destination address, as well as particular interface 34,36 utilized to deliver the network traffic 7. Further, particular network 14,16,18 portions and/or series of network devices 9 (defining a network path or path portions) can also be identified in analysis of the network traffic 7.

The principal that network traffic 7 arriving through the public network interface 36 that the data management system 52 expects through the private network interface 34 (as identified via comparison of packet parameters of the network traffic 7 with the predefined pairings data 38 stored in storage 24) is likely to be invalid (e.g. source-spoofed) and hence the presence of the private network interface 34 as a direct interconnect between the servers 10,12 facilitates assessment of the normality/abnormality of the general network traffic 7 received from the network 14,16,18, which can then be used as the basis for traffic prioritisation by the data management system 52 in conjunction with the prioritization criteria 39 associated with the invalid (e.g. source-spoofed) network traffic 7 when so identified.

For example, the network traffic 7 is comprised of considered stateless data structured as packetized data. The packets of the network traffic 7 can be defined as a basic unit of communication over the digital communications network 14,16,18. A packet can also be referred to as a datagram, a segment, a block, a cell or a frame, depending on the protocol used for the transmission of data over the communication network 14,16,18. When data has to be transmitted, it is broken down into similar structures of data before transmission, called packets, which are reassembled to the original data chunk once they reach their destination. The structure of the data packet depends on the type of packet it is and on the protocol used for transport, however each data packet can have a header and a payload. The header can be used to keep overhead information about the packet, the service, and other transmission-related data. For example, data transfer over the Internet requires breaking down the data into IP packets, which is defined in IP (Internet Protocol), and an IP packet can include: the source IP address, which is the IP address of the machine sending the data; the destination IP address, which is the machine or device to which the data is sent; the sequence number of the packets, a number that puts the packets in order such that they are reassembled in a way to get the original data back exactly as it was prior to transmission; the type of service; any relevant flags; and the payload itself, which represents the bulk of the packet and is actually the data being carried. For example, all data other than the payload itself, as provided above, can be considered as overhead information.

As an example of network traffic 7, DNS Requests 30 can contain questions that specify a name (or maybe a somewhat arbitrary text field) and a record type—the content of the response will vary depending on the type. The DNS protocol uses two types of DNS messages, queries 30 and replies 32, such that they both can have the same format. Each message can consists of the header and four sections: question, answer, authority, and an additional space. A header field (flags) controls the content of these four sections. The requests 30 can be simple direct lookups of a server name looking for an ip-address in response (Type A), looking for more information on name servers themselves (Type NS), mail records (Type MX), as well as other services (Type SRV that will return names, ports, weights and priorities). DNS responses 32 can contain answers to these questions of the DNS request 30, possibly more than one if the DNS request 30 requires that and are not always just IP addresses.

For example, the header section of the DNS message can contain the following fields: Query ID, Flags, the number of entries in the Question section, the number of entries in the Answer section, the number of entries in the Authority section, and number of entries in the Additional section. The Query ID field can be used by the requester servers 12 to match responses with queries. The flag field can consist of several sub-fields. The first can be a single bit ("QR") which indicates if the message is a query (0) or a reply (1). The second sub-field can consist of four bits which together form a value that describes the purpose of the DNS message ("OPCODE") which is generally 1 meaning "query" for query traffic between requester servers 12 and responder servers 10 but for which other values exist for other purposes. A single-bit sub-field ("AA") can indicate if the contents of the Answer section in a response from a DNS server 10 should be considered authoritative by the Requester Server 12 which receives the response. Another single-bit sub-field can indicate if the client (device 8,12) wants to send a recursive query ("RD"). The next single-bit sub-field can indicate if the replying DNS server 10 supports recursion ("RA"), as not all DNS servers are configured to do this task. Another sub-field can indicate if the request 30 was truncated for some reason ("TC"), and a four-bit sub-field indicates status. The Question section can contain the domain name ("QNAME"), type of record (A, AAAA, MX, TXT, etc.) ("QTYPE") and the class of name ("QCLASS") which for names resolved for use on the Internet is usually IN. The domain name can be broken into discrete labels which are concatenated; each label is encoded in the wire format of the DNS message as the length of that label followed by the label itself, or as a pointer to another encoding of a domain name in the same message, a mechanism known as label compression which can help reduce the size of DNS messages. The Answer section can contain resource records relating to the query described in the Question section. A single domain name can have multiple resource records of the same or different types associated with it. The Authority and Additional sections contain additional information that is relevant to the type of response being returned from a responder server 10 to a requester server 12.

As can be seen by the above structure of the packet-based network traffic 7, the difficulties determining the traceability of different traffic sources in real-time by the responder servers 10 can be avoided if layers of the protocol stack are identified by the data collection system 50 in order to generate the pairings data 38 to pre-sort network traffic 7 by origin on each of the interfaces 34,36 (i.e. the network traffic 7 origin as well as the specific interface 34,36 used to deliver the network traffic 7 are contained in the pairings data 38 (e.g. data pairing for network traffic X is network source Y uses interface Z for delivery). Therefore the responder server 10 would expect to receive the network traffic X (as addressed by network source Y) predominantly on the interface Z. In other words, in the example where the traffic management system 52 receives network traffic Z over an interface ZZ (i.e. other than interface Z), the management system 52 would consult the pairings data 38 stored in the database 24 and note that the received network traffic X was received on the wrong interface, i.e. interface ZZ rather than on interface Z. Based on this identification, the data management system 52 could decide what prioritization criteria 39 to apply to the network traffic X being received on the interface ZZ, thereby in effect prioritizing the proper network traffic X being received on the interface Z. It is recognised that the number of significant traffic sources 12 given access to their own defined private network interface 34, as described above, is manageable by the data management system 52, as the provision of the multi-interface model of interfaces 34,36. This multi-interface model of interfaces 34,36 provides for isolation of each traffic source (e.g. requester server 12) in such a way that they are delivered independently of each other (and, perhaps more importantly, independently of attack traffic coming in through the public network interface 36). Straight forward application of the pairings data 38 stored in the database 24 in conjunction with network traffic 7 arriving over a plurality of separately defined interfaces 34,36 reduces the need to rely upon more traditional data management techniques of "resolver services" such as scrubbing services or appliances that are deemed computationally expensive and therefore inefficient. For example, the scrubbing methodologies must be executed in real time as network messages are received, for packetized network traffic the various layers of the packet must be opened and content analyzed for errant messages, which are considered undesirable brute force methodologies that are typically administered by third party scrubbing suppliers. It is recognised that resorting to the use of real time scrubbing methodologies can negatively impact request response timing.

Accordingly, the data management system 52 relies upon the correlations (of the pairings data 38) exists between requester server traffic 30 and the size of the end-user populations (i.e. network sources 8) that each requester server 12 serves, in order to effect the handling of request network traffic 30 from a relatively small number of identified requester networks 14 via specified private network interface(S) 34. The generation and implementation of the pairings data 38 has the potential to impact the experience of a large proportion of end-users (e.g. source devices 8) sharing the public network interface 36, as any identified network traffic 7 improperly using the public network interface 36 can be dealt with accordingly (e.g. dropped) via the prioritization criteria and therefore free up the remaining bandwidth/capacity of the public network interface 36 for the large proportion of end users (e.g. source devices 8) who are properly utilizing the public network interface 36. For example, in analysis of network traffic 7 using our DNS name server 10 infrastructure, eleven resolver servers 12 out of over 30,000 were responsible for almost half of the query traffic received by our DNS name servers 12. This information was used by the data collection system 50 to generate the appropriate initial pairings data 38 along with the provision of the private network interface(s) 34 for those eleven identified resolver servers 12. Accordingly, in this example, half of our query traffic 30 can be made to arrive over the dedicated interconnects (i.e. private network interface(s) 34) whose characteristics are well-understood, resulting in the potential impact to end-users from unwanted or hard-to-handle traffic as similarly halved on the public network interface 36 utilized by them and therefore those end-users could enjoy reduced risk of disruption due to unknown network traffic 7 regardless of which network path their query traffic takes as received on the public network interface 36 by the responder server(s) 10.

The above is a major advantage to both the identified requester servers 12 using the private network interface(s) 34, as well as the distributed source devices 8 using the public network interface(s) 36, as the ability to source and deliver attack traffic 7 at scale increases, so does the cost and complexity of delivering corresponding capacity on the authoritative server side would increase in absence of using the multi-interface 34,36 architecture with the predefined pairings data 38. Simply stated, it is no longer possible, never mind cost-effective or practical, to compete with a highly distributed botnet infrastructure by simply building ahead of anticipated peak traffic by simply and non-intelligently increasing network 14,16,18 capacity. Accordingly, the growth characteristics of dedicated requester server 12 interconnects 34 can be much easier to forecast that capacity of network traffic 7 arriving on the public network interface 36, thanks in no small part to the possibility of operator dialogue on both sides (between the requester server 12 and the responder server 10 operators) and a combined understanding of the network traffic 7 involved (as exemplified by the predefined pairings data 38). If "unwanted" network traffic 7 does feature/present on the dedicated requester server 12 interconnect 34, as identified via consultation/comparison of the network traffic parameter(s) (e.g. source address of the packet header), understanding its root cause and mitigating it is a practical approach, in contrast to the delivery of general service to the entire Internet where, as discussed, even identifying the operators responsible for particular traffic can be a challenge.

The pairings data 38 can include network source address associated with an interface identifier of the private network interface 34 expecting such network traffic 7 from the specified network source address (e.g. the network address of the requester server 12). In addition, optionally the pairings data 38 can also include communication protocol specific parameters (e.g. request types), for example in the case of DNS protocol the pairings data 38 can include DNS-specific parameters (QNAME, QTYPE, RCODE, etc.). In this manner, the pairings data 38 can be extended dimensionally to include aggregate DNS data along with the specific interconnect identifiers (of the interface 34) alongside DNS-specific parameters (QNAME, QTYPE, RCODE, etc.) and the anycast distribution parameters (e.g. location specific parameter of the network address of the requester server 12).

Accordingly, an advantage of the multi-interface configuration used in conjunction with the pairings data 38 Is that the deemed normality of individual request sources would depend upon the path taken by the network traffic request 30; for example a source network address associated with a specified requester server 12 (e.g. Google Public DNS) of the network request traffic 30 might reasonably enjoy a better normality score if such network request traffic 30 arrives over the direct interconnect (i.e. assigned private network interface 34) with the specified requester server 12 than if such network request traffic 30 arrives through some other interface (e.g. the public network interface 36), where the data management system might reasonably access such network request traffic 30 as having been spoofed (i.e. deemed abnormal). Added to the identification process for normality could be protocol parameters in addition or substitution. For example, network request messages 30 arriving from the requester server 12 improperly (i.e. on the public network interface 36 rather than on the designated (i.e. assigned) private network interface 34) would be treated/de-prioritized differently depending upon the associated protocol parameter (e.g. request type) of the network request messages 30.

Referring to FIG. 2, the data management system 52 and data collection system 50 can be hosted on a server (see FIG. 4) configured as having, by example, a dedicated passive measurement service (i.e. a service that listens to the network request traffic 30 and network response traffic 32 without interfering with the network traffic 7 flow between the servers 10,12). For example, the network request traffic 30 and network response traffic 32 are captured in periodic (e.g. five-minute) data samples windows by the data collection system 50 that are stored in the storage 25. These data samples of the periodic windows are then subjected by the data collection system 50 the batch processing which breaks each message of the network traffic 7 down into its constituent parameters (e.g. message source address, message destination address, message type, interface 34,36 received on, etc.). Each parameter considered has a corresponding respective parameter counter that is increased according to the observed value of the parameter. These parameter counters are flushed periodically (e.g. after each periodic window) and centralised in the storage 25, each with accurate timestamps that indicate the time period to which each parameter counter corresponds. Examples of parameters are the transport protocol (e.g. DNS) that carried the message (currently UDP or TCP for the DNS protocol), the network 14,16,18 (e.g. IP) protocol that was used beneath that (currently IPv4 or IPv6), the message type (e.g. QNAME), the source network 14 (a generalised value derived from the source address), the responder server 10 at which the query was received, and an interconnection identifier assigned to the interface 34,36 upon which the message was received. It is recognised that collective counts of all request traffic 30 received and response traffic 32 sent are maintained. In this manner, the parameter counts identify, depending upon the parameters used to classify the messages, the expected volume of the particular messages arriving/being sent with respect to the responder server 12 as well as the interface 34,36 upon which to expect the messages. In this manner, the pairings data 38 can include the parameter counts, the parameters themselves, the time period(s) of the messages in order to predict network traffic 7 flow over time, etc., thereby establishing the network traffic almanac in the storage 24 (for example as transferred by the data collection system 50 for use by the data management system 52). It is recognised that the data collection system 50 and/or the data management system 52 can be hosted on the responder server 10 and/or separate server(s) in communication with the responder server 10. for example, in the case of a separate server implementation, the responder server 10 could query the separate server using parameters of network traffic 7 identified in real time so that the data management system 52 can identify whether the network traffic 7 is classified as normal or abnormal as a result of comparison of the parameters of the real time network traffic 7 with the pairings data 38 associated with the particular interface 34,36.

It is recognised that comparison of the parameter counters facilitates the data management system 52 to infer the characteristics of the network traffic 7. For example, if for a particular sample period window the parameter counter for all network request traffic 30 arriving over direct interface 34 link A is 1000, and the parameter counter for all such network request traffic 30 with UDP transport is 980 and the parameter counter for all such network request traffic 30 with TCP transport is 20, we can consider that during that sample period window a certain percentage (e.g. 98%) of network request traffic 30 arrived with one (e.g. UDP) transport and another percentage (e.g. 2%) arrived using a different transport (e.g. TCP). We can further characterise the network traffic 7 using other parameters; we would be able to determine that at a particular responder server 10 a determined percentage (e.g. 40%) of all network request traffic 30 received are for specified domain names under a respective TLD (e.g. COM), or that a ranked order (e.g. top-ten) requested domains are a particular set of domains.

Further, the pairings data 38 can contain analysis for correlations tracked over time and be used by the data management system 52 to understand the manner in which they vary using signal analysis. For example, a relation that generally increases slowly over time with no other regular oscillations might be used to predict that future normal behaviour follows; in effect the data management system 52 is using the observed signal characteristics over a long enough time base to build the network traffic almanac which predicts future behaviour of the network traffic 7. The techniques for the signal analysis can include cluster analysis, predictive machine learning, simple Fourier analysis, by example.

For example, the data management system 52 can send the prioritization command(s) 40 (e.g. distilled mitigation datasets into BGP for RTBH-like signalling) to upstream providers at the IP layer, e.g. network devices 20,21 and flowspec-like signalling to the network devices 21,22 operated in conjunction with the responder network 18. Use of these prioritization command(s) 40 provides an opportunity to work with upstream providers on expanded vocabularies (as provided by the parameters included in the pairings data 38) to allow richer pattern matching than simple RTBH processing would permit.

Figure 3:
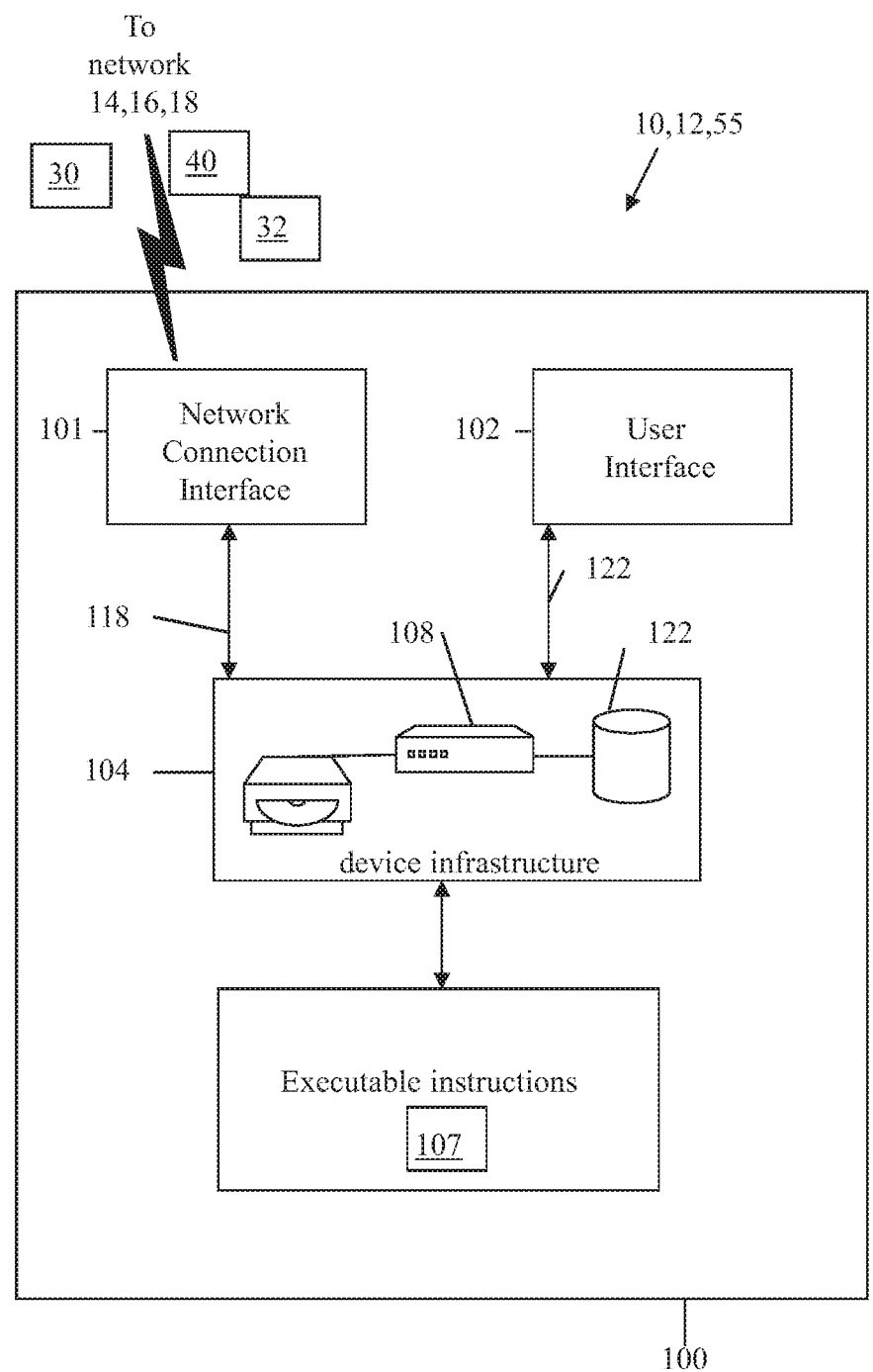
FIG. 3 is an example configuration of a computer device hosting the traceability service of FIG. 2.
Figure 4:
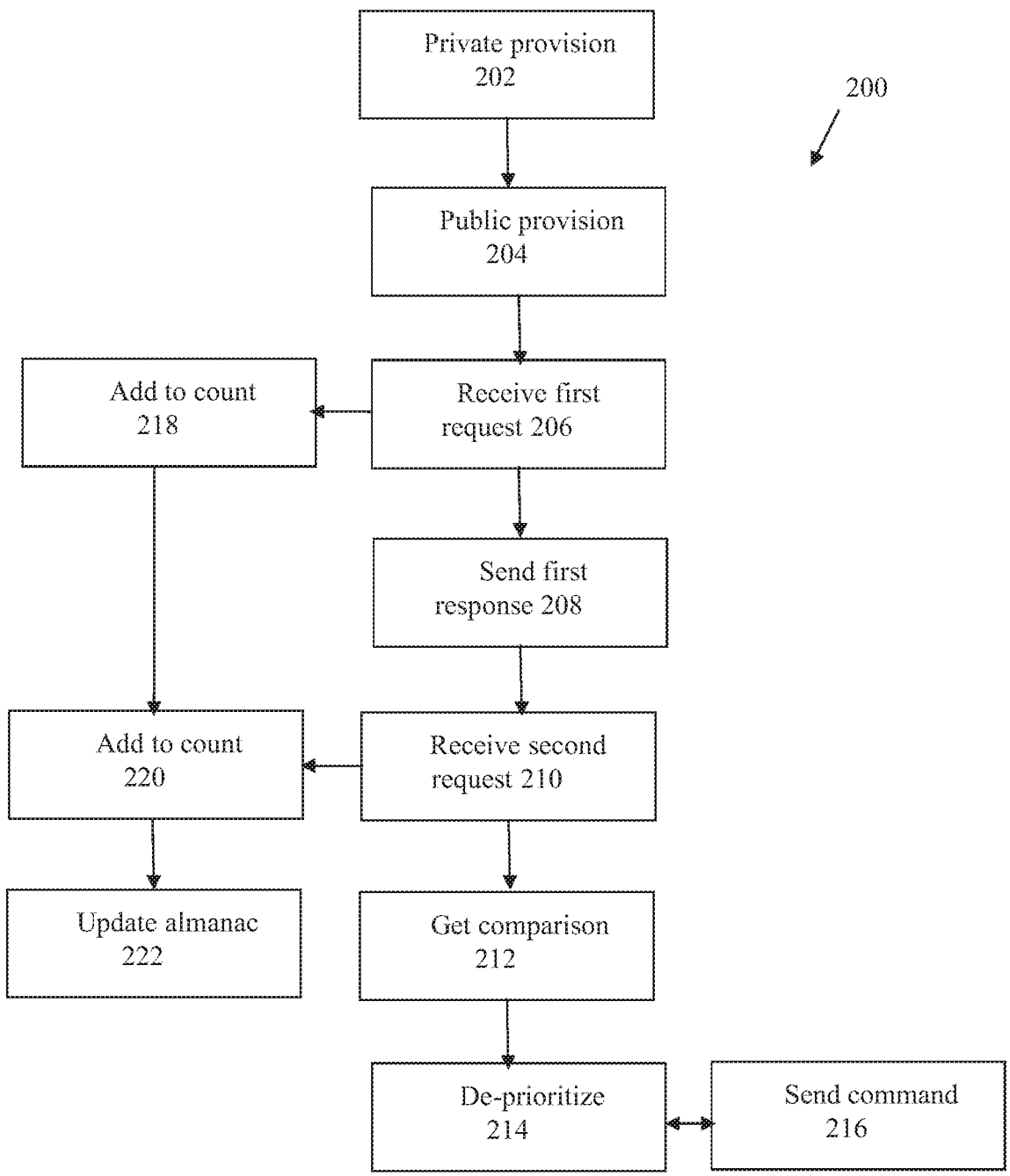
FIG. 4 is an example implementation of the traceability service of FIG. 2.

Referring to FIGS. 1,2 and 4, shown is a method 200 for determining the traceability of network request traffic 30 over a communications network 14,16,18 for reducing strain in traffic processing resources, as implemented by the traceability system 53, as executed on one or more server devices 100 (see FIG. 3). The method 200 can be implemented as an application 107 stored in the storage 24 as executed by a computer processor(s) 108 of the one or more server devices 100. At step 202, provisioned is a direct interconnect 34 on the communications network 14,16,18 between the server 10 and a predefined source 12, the direct interconnect 34 providing a private service interface between the predefined source 12 and the server 10 configured for receiving the network request traffic 30 addressed from the predefined source 12, a defined pairings data 38 of the predefined source 12 with the direct interconnect 34 stored in a storage 24 as a network traffic almanac. At step 204, provisioned is a public service interface 36 on the communications network 14,16,18 configured for receiving the network request traffic 30 addressed from the predefined source 12 and from other sources (e.g. 8), the public service interface 36 separate from the direct interconnect 34. At step 206, received is a first request traffic 30 addressed from the predefined source 12 via the direct interconnect 34, and at step 208 the responder server 10 processes the first request traffic 30 by generating a first query response 32 and sending the first query response 32 via at least one of the direct 34 and the public service interface 36 for communicating over the communications network 14,16,18 to the predefined source 12. At step 210, received is a second request traffic 30 having an address of the predefined source 12 via the public service interface 36. At step 212, the data management system 52 is consulted in order to compare the defined pairings data 38 with the address to determine the second request traffic 30 matches the predefined source 12, such that the predefined source 12 is associated with the direct interconnect 34 as identified by the pairings data 38 via the interface ID of the pairings data 38 associated with the predefined source 12. At step 214, the data management system 52 and/or the responder server 10 utilizes the results of the comparison to implement a prioritization criterion(ia) 39 associated with the pairings data 38 by de-prioritizing the processing by the server 10 of the second request traffic 30 based on the second request traffic 30 being received on the public service interface 36 rather than on the direct interconnect 34 by dynamically applying a prioritize criterion 39 to the second request traffic 30 before generating a second response traffic 32. It is recognised that the implementation of the prioritization criterion (ia) 39 can include sending a prioritization command 40 at step 216 to one or more the network devices 21,22 in at least one of the network 18, the sub network 18a or the sub network 16a.

Also shown, as described in more detail above, are the steps of 218 and 220 for analyzing the network traffic 7 for adding to the count data by the data collections system 50 and then updating the pairings data 38 in the network traffic almanac using the count data as stored in the storage 24. Step 222 can include dynamically monitoring the network traffic 7 and adjusting the prioritization criteria 39 based on analysis results of the monitoring.

Referring to FIG. 3, shown is an example of a server device 100 (e.g. requester server 12, responder server 10 and traceability server 55, as well as the storage 24.

In view of the above descriptions of storage 24 for the computer devices 100 of the requester server 12, the responder server 10 and optionally the traceability server 55, storage 24 can be configured as keeping the stored data (e.g. pairings data 38 and prioritization criteria 39 associated with the network traffic almanac) in order and the principal (or only) operations on the stored data are the addition/amendment of or removal of the stored data from storage 24 (e.g. FIFO, FIAO, etc.). For example, storage 24 can be a linear data structure for containing and subsequent accessing of the stored data and/or can be a non-linear data structure for containing and subsequent accessing of the stored data.

Further, storage 24 receives various entities such as data that are stored and held to be processed later. In these contexts, storage 24 can perform the function of a buffer, which is a region of memory used to temporarily hold data (e.g. category counts) while it is being moved from one place to another (i.e. between the between computer devices 100). Typically, the data is stored in the memory when moving the data between processes within/between one or more computers. It is recognised that storage 24 can be implemented in hardware, software, or a combination thereof. The storage 24 is used in the network system 6 when there is a difference between the rate/time at which data is received and the rate/time at which the data can be processed (e.g. ultimately by the devices 100).

Further, it will be understood by a person skilled in the art that memory/storage 24 described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 24 can be divided into: (1) primary storage, which holds data in memory (sometimes called random access memory or RAM) and other "built-in"

devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media. As such, the storage used to hold the counting data can be as secondary storage and the storage used to hold the pairings data 38 and/or the prioritization criteria 39 can be primary storage.

A database is one embodiment of memory 24 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 24 can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server, it is recognised that the computer devices 100 can be configured as hardware, software, or typically a combination of both hardware and software to provide a network entity that operates as a socket listener. It is recognised that any computerised process that shares a resource (e.g. data) to one or more client processes can be classified as a server in the network system 6. The term server can also be generalized to describe a host that is deployed to execute one or more such programs, such that the host can be one or more configured computers that link other computers or electronic devices together via the network 14,16,18. The computer devices 100 implementing functionality of requester server 12, the responder server 10 and optionally the traceability server 55 can provide specialized services across the network 14,16,18. In the network system 6, the servers 12,10,55 can have dedicated functionality and/or can share functionality as described. Enterprise servers are servers that are used in a business context and can be run on/by any capable computer hardware. In the hardware sense, the word server typically designates computer models intended for running software applications under the heavy demand of a network 14,16,18 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Referring to FIG. 3, a computing device 100 implementing functionality of the requester server 12, responder server 10 and/or the traceability service 53 of the traceability server 55 can include a network connection interface 101, such as a network interface card or a modem, coupled via connection 118 to a device infrastructure 104. The connection interface 101 is connectable during operation of the devices to the network 14,16,18 (e.g. an intranet and/or an extranet such as the Internet), which enables the devices to communicate with each other as appropriate. The network 14,16,18 can support the communication of the communications 7,30,32,40 and the related content.

Referring again to FIG. 3, the device 100 can also have a user interface 102, coupled to the device infrastructure 104 by connection 122, to interact with a user (e.g. server administrator—not shown). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 3, operation of the device 100 is facilitated by the device infrastructure 104. The device infrastructure 104 includes one or more computer processors 108 and can include an associated memory 122 (e.g. memory 24). The computer processor 108 facilitates performance of the device 100 configured for the intended task (e.g. of the respective module(s) 50,52 of traceability service 53) through operation of the network interface 101, the user interface 102 and other application programs/hardware of the device 100 by executing task related instructions. These task related instructions can be provided by an operating system, and/or software applications located in the memory 122, and/or by operability that is configured into the electronic/digital circuitry of the processor(s) 108 designed to perform the specific task(s). Further, it is recognized that the device infrastructure 104 can include a computer readable storage medium coupled to the processor 108 for providing instructions to the processor 108 and/or to load/update the instructions 107 (e.g. modules 50,52 and/or additions/deletions/amendments to the pairings data 38 and/or the prioritization criteria 39). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 100 can include the executable applications comprising code or machine readable instructions for implementing predetermined functions/operations including those of an operating system and the modules 50,52, for example. The processor 108 as used herein is a configured device and/or set of machine-readable instructions for performing operations as described by example above, including those operations as performed by any or all of the modules 50,52. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the modules may be implemented in hardware, software or a combination of both. Accordingly, the use of a processor 108 as a device and/or as a set of machine-readable instructions is hereafter referred to generically as a processor/module for sake of simplicity. Further, it is recognised that the traceability service 53 can include one or more of the computing devices 100 (comprising hardware and/or software) for implementing the modules, as desired.

It will be understood in view of the above that the computing devices 100 may be, although depicted as a single computer system, may be implemented as a network of computer processors, as desired.

In several example embodiments, one or more of the operational steps in each embodiment may be omitted or rearranged. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those of ordinary skill in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims.

What is claimed is:

1. A method for determining the traceability of network request traffic over a network for reducing strain in traffic processing resources, which method comprises: by a server:
provisioning a direct interconnect on the network between the server and a predefined requester server associated with a predefined source, the direct interconnect providing a first interface between the predefined requester server and the server receiving the network request traffic addressed from the predefined source, a defined pairings data of the predefined source with the direct interconnect stored in a storage as a network traffic almanac;
utilizing a second interface with the network for facilitating network communication between the server and one or more other servers associated with at least one of the predefined source and other sources, the second interface receiving the network request traffic addressed from the predefined source and from the other sources using the one or more other servers, the second interface separate from the first interface;
receiving a first request traffic addressed from the predefined source via the first interface, the first traffic request having an address associated with the predefined source in a first packet header of the first request traffic;
processing the first request traffic by generating a first query response and sending the first query response via at least one of the first interface and the second interface for communicating over the network to the predefined requester server;
receiving a second request traffic having the address associated with the predefined source via the second interface, the address contained in a second packet header of the second request traffic;
consulting the defined pairing data with the address to determine the second request traffic matches the address of the predefined source; and
de-prioritizing the processing of the second request traffic based on the second request traffic being received on the second interface rather than on the first interface by dynamically applying a prioritize criterion to the second request traffic before generating a second response traffic, such that said applying the prioritize criterion is performed without relying upon opening various layers of the packet and analyzing content of the various layers for errant content;
wherein a content of the second response traffic is based on said applying the prioritize criterion.

2. The method of claim 1, wherein the direct interconnect operating as a private service interface is a physical interconnect as a direct layer-2 or layer-3 interconnect between the server and the predefined requester server.

3. The method of claim 1, wherein the direct interconnect operating as a private service interface is a logical network connection on a private network of the predefined requester server, the private network coupled to the network.

4. The method of claim 1, wherein the direct interconnect operating as a private service interface is a logical network connection on the network.

5. The method of claim 1, wherein a DNS protocol is utilized to structure the first request traffic, the second query request traffic, the first response traffic and the second response traffic.

6. The method of claim 2, wherein the responder server is an authoritative DNS server and the requester server and the other requester servers are resolver DNS servers coupled to the communications network.

7. The method of claim 1, wherein the prioritization criterion is selected from the group consisting of: expected geographic location of the predefined source; expected network address or utilized network of the predefined source; type of resource record of the second request traffic; and current remaining bandwidth capacity of the second interface.

8. The method of claim 1, which further comprises sending a prioritization notification to a network device associated with the predefined source as part of said de-prioritizing processing, the prioritization notification instructing de-prioritization of the network request traffic by the network device from the server for such network request traffic having identified packet header information the same as the second request traffic.

9. The method of claim 1, which further comprises sending a prioritization notification to a network device associated with the server as part of said de-prioritizing processing, the prioritization notification instructing de-prioritization of the network request traffic by the network device from the server for such network request traffic having identified packet header information the same as the second request traffic.

10. The method of claim 1, which further comprises using at least one DNS specific parameter as part of said de-prioritizing processing, such that the at least one DNS specific parameter is included in the defined pairings data.

11. The method of claim 8, wherein said de-prioritizing processing includes dropping the second request traffic thereby making the second response traffic a null response.

12. The method of claim 9, wherein said de-prioritizing processing includes dropping the second request traffic thereby making the second response traffic a null response.

13. The method of claim 10, wherein said de-prioritizing processing includes dropping the second request traffic thereby making the second response traffic a null response.

14. The method of claim 1, which further comprises provisioning the direct interconnect to provide the first interface between a second predefined requester server associated with a second predefined source and the server receiving the network request traffic addressed from the second predefined source, a defined pairings data of the second predefined source with the direct interconnect stored in the storage as part of the network traffic almanac, wherein the network request traffic from both the predefined source and the second predefined source are communicated on the common direct interconnect.

15. The method of claim 14, wherein the direct interconnect facilitates capacity management of bandwidth associated with the network request traffic addressed from both the predefined source and the second predefined source through utilization of differences in peak timing based on time zone differential of the predefined source and the second predefined source.

16. The method of claim 1, which further comprises provisioning a second direct interconnect to provide a third interface between a second predefined requester server associated with a second predefined source and the server receiving the network request traffic addressed from the second predefined source, a defined pairings data of the second predefined source with the second direct interconnect stored in the storage as part of the network traffic almanac, whereby the network request traffic from the predefined source and the second predefined source are separated by the server based on usage of either the first interface or the third interface.

17. The method of claim 1, which further comprises dynamically monitoring the network traffic and adjusting the prioritization criteria based on analysis results of the monitoring.

18. A server for determining the traceability of network request traffic over a network for reducing strain in traffic processing resources, the server comprising:

a computer processor having a set of instructions stored on a storage for configuring the computer processor to:

provision a direct interconnect on the network between the server and a predefined requester server associated with a predefined source, the direct interconnect providing a first interface between the predefined requester server and the server receiving the network request traffic addressed from the predefined source, a defined pairings data of the predefined source with the direct interconnect stored in a storage as a network traffic almanac;

utilize a second interface with the network for facilitating network communication between the server and one or more other servers associated with at least one of the predefined source and other sources, the second interface receiving the network request traffic addressed from the predefined source and from the other sources using the one or more other servers, the second interface separate from the first interface;

receive a first request traffic addressed from the predefined source via the first interface the first request traffic having an address associated with the predefined source in a first packet header of the first request traffic;

process the first request traffic by generating a first query response and sending the first query response via at least one of the first interface and the second interface for communicating over the network to the predefined requester server;

receive a second request traffic having the address associated with the predefined source via the second interface, the address contained in a second packet header of the second request traffic;

consult the defined pairing data with the address to determine the second request traffic matches the address of the predefined source; and de-prioritize the processing of the second request traffic based on the second request traffic being received on the second interface rather than on the first interface by dynamically applying a prioritize criterion to the second request traffic before generating a second response traffic, such that said applying the prioritize criterion is performed without relying upon opening various layers of the packet and analyzing content of the various layers for errant content;

wherein a content of the second response traffic is based on said applying the prioritize criterion.

19. The system of claim 18, wherein the second interface operates as a public service interface.

20. The method of claim 1, wherein the second interface operates as a public service interface.

* * * * *